(12) United States Patent
Kim et al.

(10) Patent No.: US 9,845,028 B2
(45) Date of Patent: Dec. 19, 2017

(54) VEHICLE SEAT HAVING IMPROVED PERFORMANCE OF REDUCING WHIPLASH INJURY

(71) Applicants: Hyundai Motor Company, Seoul (KR); Kia Motors Corporation, Seoul (KR)

(72) Inventors: Doo Ri Kim, Goyang-si (KR); Gil Ju Kim, Seoul (KR); Seon Chae Na, Yongin-si (KR); Chan Ho Jeong, Gunpo-si (KR); Jung Sang You, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 19 days.

(21) Appl. No.: 14/957,378

(22) Filed: Dec. 2, 2015

(65) Prior Publication Data
US 2016/0207428 A1   Jul. 21, 2016

(30) Foreign Application Priority Data

Jan. 16, 2015   (KR) .................... 10-2015-0007843

(51) Int. Cl.
*B60N 2/42*   (2006.01)
*B60N 2/427*   (2006.01)

(52) U.S. Cl.
CPC ....... *B60N 2/42745* (2013.01); *B60N 2/4228* (2013.01); *B60N 2/42709* (2013.01)

(58) Field of Classification Search
CPC ......... B60N 2/667; B60N 2/66; B60N 2/4221

USPC ...... 297/216.3, 216.4, 284.4, 216.13, 216.14
See application file for complete search history.

(56) References Cited

U.S. PATENT DOCUMENTS

| | | | | |
|---|---|---|---|---|
| 590,045 | A * | 9/1897 | Mauchain | A47C 7/465 297/284.4 |
| 3,241,879 | A * | 3/1966 | Castello | A47C 7/30 267/89 |
| 4,565,406 | A * | 1/1986 | Suzuki | A47C 7/462 297/284.4 |
| 4,957,102 | A * | 9/1990 | Tan | A47C 7/462 297/284.6 |
| 5,507,559 | A * | 4/1996 | Lance | B60N 2/6673 297/284.4 |
| 5,685,606 | A * | 11/1997 | Lance | A47C 7/462 297/284.1 |

(Continued)

FOREIGN PATENT DOCUMENTS

| | | |
|---|---|---|
| JP | 2003-159972 A | 6/2003 |
| JP | 2004-131059 A | 4/2004 |

(Continued)

*Primary Examiner* — Jose V Chen
(74) *Attorney, Agent, or Firm* — Morgan, Lewis & Bockius LLP

(57) ABSTRACT

A vehicle seat may include a protrusion member installed to a lower portion of a back frame inside a seatback to protrude forward and to absorb an impact on the hips of an occupant upon a vehicle collision, wherein a lower portion of the seatback, which has a protrusion shape due to the protrusion member, induces a sitting posture of the occupant to be modified when the occupant sits down on the vehicle seat, thereby reducing a gap between a head of the occupant and a headrest in a state that the hips of the occupant moves forward.

14 Claims, 8 Drawing Sheets

(56) References Cited

U.S. PATENT DOCUMENTS

| | | | | |
|---|---|---|---|---|
| 5,797,652 A * | 8/1998 | Darbyshire | B60N 2/6671 | 297/284.2 |
| 5,860,700 A * | 1/1999 | Lance | B60N 2/6673 | 297/284.2 |
| 6,033,025 A * | 3/2000 | Christofferson | A61G 5/10 | 297/284.4 |
| 6,079,785 A * | 6/2000 | Peterson | A47C 7/462 | 297/284.5 |
| 6,354,662 B1 * | 3/2002 | Su | A47C 7/46 | 297/284.4 |
| 6,412,868 B1 * | 7/2002 | Kuster | B60N 2/667 | 297/284.4 |
| 6,471,294 B1 * | 10/2002 | Dammermann | A47C 7/24 | 297/284.4 |
| 6,575,530 B1 * | 6/2003 | Fischer | A47C 7/462 | 297/284.1 |
| 6,644,740 B2 * | 11/2003 | Holst | B60N 2/0232 | 297/284.4 |
| 7,097,247 B2 * | 8/2006 | Battey | A47C 1/03255 | 297/284.4 |
| 7,425,036 B2 * | 9/2008 | McMillen | B60N 2/6671 | 297/284.4 |
| 7,780,233 B2 * | 8/2010 | McMillen | B60N 2/66 | 297/284.4 |
| 7,918,506 B2 * | 4/2011 | Hsiao | A47C 7/462 | 297/284.11 |
| 8,777,309 B2 * | 7/2014 | Demontis | B60N 2/42727 | 297/216.13 |
| 2002/0036420 A1 * | 3/2002 | Footitt | A47C 1/023 | 297/284.4 |
| 2003/0085600 A1 * | 5/2003 | Mori | B60N 2/667 | 297/284.4 |
| 2007/0216208 A1 * | 9/2007 | Maier | A47C 7/46 | 297/284.4 |
| 2010/0066136 A1 * | 3/2010 | D'Agostini | B60N 2/4228 | 297/216.12 |
| 2016/0374474 A1 * | 12/2016 | Wu | A47C 7/462 | 297/284.4 |

FOREIGN PATENT DOCUMENTS

| | | |
|---|---|---|
| JP | 2012-25240 A | 2/2012 |
| JP | 2014-111405 A | 6/2014 |
| KR | 10-0501577 B1 | 7/2005 |
| KR | 10-2005-0077198 A | 8/2005 |
| KR | 10-2005-0115108 A | 12/2005 |
| KR | 10-2009-0065722 A | 6/2009 |
| KR | 10-2010-0025085 A | 3/2010 |
| KR | 10-2010-0041330 A | 4/2010 |
| KR | 10-2010-0060373 A | 6/2010 |
| KR | 10-2014-0068660 A | 6/2014 |

* cited by examiner (a) PLAN VIEW    (b) PERSPECTIVE VIEW (a) BEFORE COLLISION (b) AFTER COLLISION (a) BEFORE COLLISION      (b) AFTER COLLISION though the occupant moves rearward, so that a support frame 13 of an upper side moves forward by a leverage principle while a link 12 located in the back of the pressing plate 11 is pushed rearward.

VEHICLE SEAT HAVING IMPROVED PERFORMANCE OF REDUCING WHIPLASH INJURY

CROSS-REFERENCE TO RELATED APPLICATION

The present application claims priority to Korean Patent Application No. 10-2015-0007843 filed on Jan. 16, 2015, which is incorporated by reference herein in its entirety.

BACKGROUND

Field of the Invention

The present invention relates to a vehicle seat, and more particularly, to a vehicle seat which is capable of mitigating whiplash of an occupant upon a collision accident by allowing the occupant's head to be closest to a headrest when the occupant sits down on the vehicle seat.

Description of Related Art

Generally, the seat provided to a vehicle needs to give comfort to an occupant when the occupant sits down thereon and in addition, sufficiently protect the occupant when an emergency situation such as a rear-end collision accident occurs.

Such a vehicle seat includes a seat cushion for supporting the lower body of an occupant, a seat back for supporting the upper body of an occupant, and a headrest coupled to a top end of the seatback to adjust the height thereof to support the head and neck region of an occupant.

Meanwhile, a neck injury of a seat occupant, which most often occurs upon a rear-end collision accident while a vehicle is stopping, is called a whiplash injury.

It has been known that the whiplash injury, that is, the injury of a neck region is caused due to a relative velocity difference between the head and torso of an occupant. When the vehicle is struck from the rear, the torso of the occupant moves forward due to an impact on the seatback but the head stays at rest, so that sharing force acts on the neck region. The sharing force has an abrupt impact upon the joints and muscles of the neck, resulting in the injury of a neck joint region.

To prevent the neck injuries, there has been developed an active headrest which is a headrest device for enhancing the safety of an occupant and allows the headrest to move to a position adjacent to the head of the occupant when a collision accident occurs. It is a trend to mitigate the neck injury of an occupant by using the active headrest.

Basically, the active headrest allows the headrest to move forward to support the head of an occupant when a collision accident occurs, such that the neck injury of the occupant is prevented. The active headrest is classified into an electronic system in which an actuator is operated according to an collision signal when a sensing unit senses a rear-end collision to transmit the collision signal to the actuator of the headrest, and a mechanical device in which the headrest moves forward by using the force of pushing the back or hips of the occupant against a seat when a rear-end collision accident occurs.

FIG. 1 is a schematic view illustrating a mechanical-type active headrest according to the related art. When a rear-end collision occurs, the back of an occupant pushes against a pressing plate 11 of a seatback while the occupant moves rearward, so that a support frame 13 of an upper side moves forward by a leverage principle while a link 12 located in the back of the pressing plate 11 is pushed rearward.

Thus, a headrest stay 14 inserted into the support frame 13 and a headrest body 15 move together forward to support the head of an occupant, so that a neck injury caused when the head is tilted back is prevented.

Mechanical-type active headrests are disclosed in Korean Patent No. 10-0551844 (Feb. 6, 2006) and Korean Unexamined Patent Publication No. 10-2005-0115108 (Dec. 7, 2005), and an electro-type active headrest is disclosed in Korean Unexamined Patent Publication No. 10-2014-0068660 (Jun. 9, 2005), as the documents of the related art.

As another technique for mitigating a neck injury of a vehicle seat, a sliding headrest used by adjusting front and rear positions of a headrest has been proposed. The sliding headrests are disclosed in Korean Patent No. 10-1033881 (May 2, 2011) and Korean Patent No. 10-1054755 (Aug. 1, 2011) as the documents of the related art.

Meanwhile, in a stage of developing a vehicle or a vehicle seat, a neck injury examination of measuring cervical vertebra and muscle injuries due to the movements of a head and a torso is conducted.

As shown FIG. 2, according to the neck injury test, after a dummy is fixed to a seat, the items related to an impact on a neck, the degree of neck bending and the degree of injury caused when the head of the dummy is tilted back and forth by causing a rear-end collision are evaluated.

In addition, as shown in FIG. 3, the considerations for reducing a neck injury in designing a seat includes static performance factors such as a backset and a height, where the backset represents a distance between a head and a headrest and the height represents a height difference between the head and the headrest.

The backset and height represent a shape and a position of a headrest which is the most important element for reducing a neck injury. The smaller the backset has a value, the more the neck injury is reduced. However, a small backset value causes interference between the head of an occupant and the headrest, so that the occupant may feel uncomfortable.

When taking the comfort of an occupant into account, there is a need to maintain a suitable backset value between the head of an occupant and the headrest. When taking the safety of an occupant into consideration, there is a need to allow the headrest to be placed at the nearest position to the head of an occupant.

Thus, when a seat is designed in consideration of the performance of reducing a neck injury, the comfort of an occupant may deteriorate.

As described above, the technique of reducing a neck injury such as an active headrest or a sliding headrest is mainly focused on the performance of reducing a neck injury, so that occupants complain about the degradation of comfort.

In particular, since the active headrest requires a plurality of additional components, the cost and weight are increased. In addition, an occupant may feel a foreign object at a top end of the seatback at which the pressing plate is placed, so that the comfort may deteriorate.

In addition, since a space exists between the head of an occupant and the headrest in all types of active headrests, the head is not limited until the headrest supports the head while moving forward when a rear-end collision occurs.

Therefore, when a long time is taken until the headrest supports the head of an occupant, a neck region of the occupant may be injured for the time.

The information disclosed in this Background of the Invention section is only for enhancement of understanding of the general background of the invention and should not be taken as an acknowledgement or any form of suggestion that this information forms the prior art already known to a person skilled in the art.

SUMMARY

Various aspects of the present invention are directed to providing a vehicle seat which induces an occupant to sit down at the nearest position to a headrest by additionally installing a member having a simple structure to the back frame of a seatback, so that the injury of the occupant's neck upon a collision may be reduced.

To achieve the objects, according to an embodiment of the present invention, there is provided a vehicle seat which includes a protrusion member installed to a lower portion of a back frame inside a seatback to protrude forward and to absorb an impact on the hips of an occupant upon a vehicle collision, wherein a lower portion of the seatback, which has a protrusion shape due to the protrusion member, induces a sitting posture of the occupant to be modified when the occupant sits down on the vehicle seat, thereby reducing a gap between a head of the occupant and a headrest in a state that the hips of the occupant moves forward.

Preferably, the protrusion member is formed of a modifiable material in order to absorb the impact and is fixed to the lower portion of the back frame to be longitudinally disposed in a traversal direction.

In addition, the protrusion member has a round shape such that both ends thereof protrude more than a central portion thereof.

In addition, the protrusion member is mounted on a front surface of a cross member installed to connect left and right side members to each other at the lower portion of the back frame.

In addition, the protrusion member is formed by bending both ends of a plate-shaped member rearward to have a c-shape, and back surface portions of both ends bent in the c-shape adhere to the front surface of the cross member.

In addition, the protrusion member is spaced apart from the cross member by an interval such that the protrusion member has a space for modification when absorbing the impact.

In addition, a support member inclined rearward extends to protrude upwardly on a top of the protrusion member.

In addition, the support surface includes an incision part formed at a central portion thereof such that left and right parts of the support surface are separated from each other by an interval.

In addition, the protrusion member is elastically supported on the lower portion of the back frame by a spring such that the protrusion member elastically moves forward and rearward.

In addition, the protrusion member is installed to the lower portion of the back frame to be longitudinally disposed in a traversal direction and has a round shape such that both ends thereof protrude more than a central portion thereof.

In addition, the protrusion member is coupled to a bracket installed to the lower portion of the back frame while the spring is interposed therebetween.

In addition, the protrusion member is installed to the lower portion of the back frame to be longitudinally disposed in a traversal direction and both ends of the protrusion member is coupled to the bracket while the spring is interposed therebetween.

In addition, the vehicle seat further includes a coupling part extending to protrude rearward from the protrusion member, wherein the spring is interposed between the coupling part and the bracket while the coupling part is inserted into an inside of the bracket.

In addition, the vehicle seat further includes a cross member installed to allow the bracket to connect left and right side members to each other at the lower portion of the back frame, wherein the protrusion member is disposed on a front surface of the cross member.

In addition, the vehicle seat further includes a coupling pin protruding from a side surface of the coupling part, and a slot formed on a side surface of the bracket to guide the coupling pin forward and rearward when the protrusion member moves forward and rearward, wherein the coupling pin is coupled to the side surface of the bracket while passing through the side surface of the bracket.

According to the vehicle seat of the present invention, the protrusion member having a simple structure is installed to the lower portion of the back frame in order to induce a sitting posture of an occupant to be modified, such that the occupant sits down in a more lying posture in the state that the hips of the occupant may be placed forward, thereby allowing the head of the occupant to be closer to the headrest. Thus, the injury due to an impact on the neck region of the occupant and a neck bending upon a collision may be mitigated.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
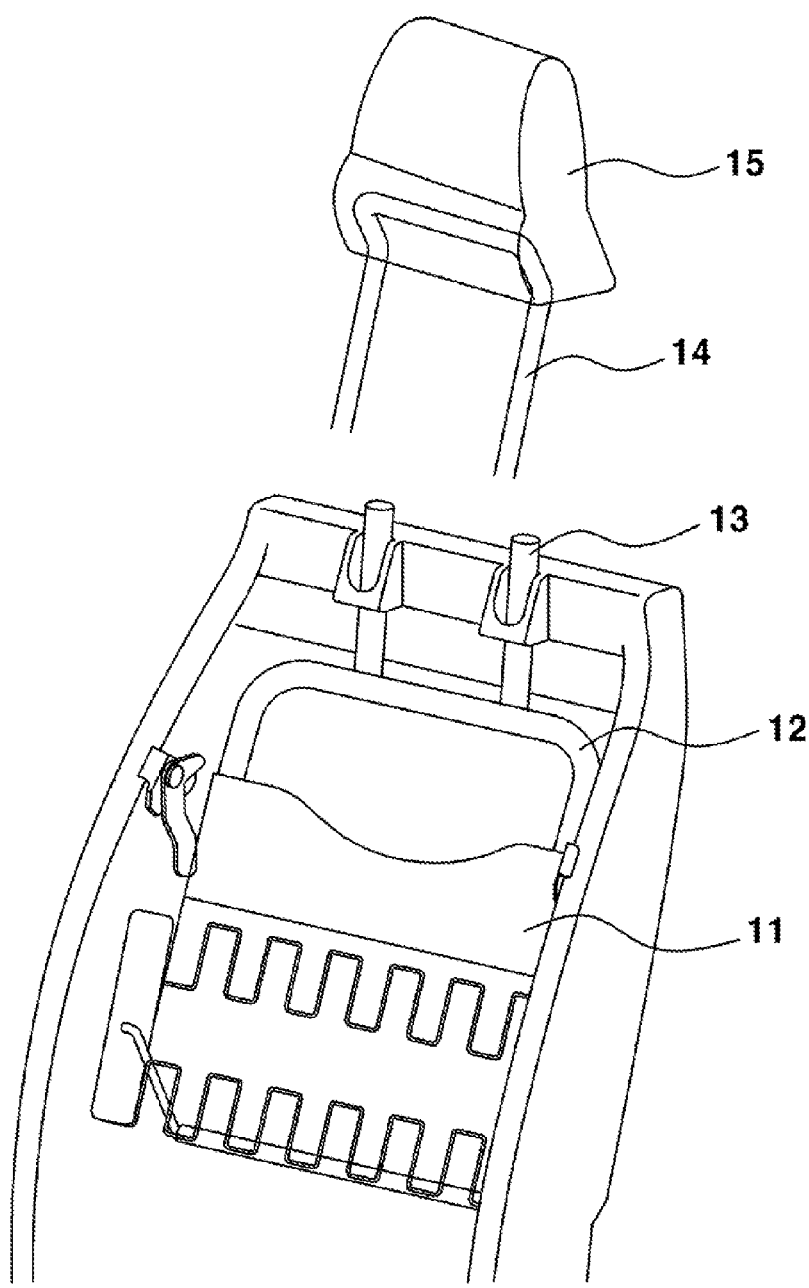
FIG. 1 is a schematic view illustrating a mechanical-type active headrest according to the related art.
Figure 2:
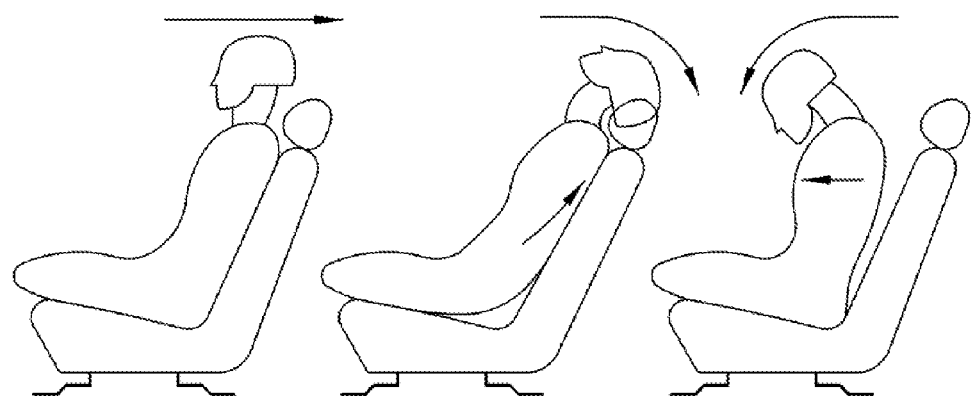
FIG. 2 is a view illustrating a neck injury test.
Figure 3:
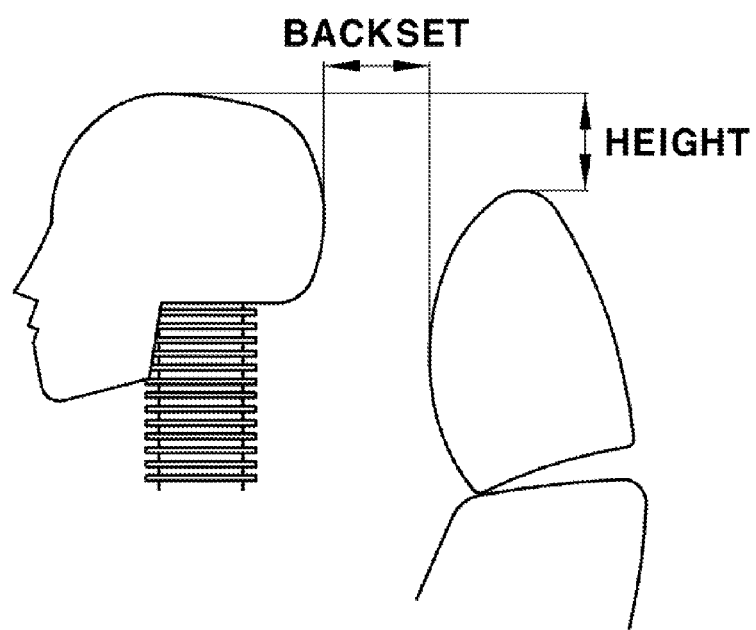
FIG. 3 is a view illustrating static performance factors for reducing a neck injury in designing a seat.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has at least two sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present invention will be described with reference to the accompanying drawings, so that those skilled in the art can easily work with the exemplary embodiments.

Various aspects of the present invention are directed to providing a vehicle seat which induces an occupant to sit down to allow the head of the occupant to be close to the headrest, so that the injury of the occupant's neck upon a collision mat be reduced.

To this end, according to the vehicle seat of the present invention, a protrusion member having a simple structure is additionally mounted on a lower portion of a back frame embedded in a seatback. The protrusion member induces a sitting posture of the occupant to be modified, such that the occupant sits down on the vehicle seat in a more lying posture in the state that the hips of the occupant may be placed forward.

As described above, as the protrusion member is mounted, the lower portion of the seatback in which the protrusion member is embedded has a partially protruding shape.

Thus, the seat according to an exemplary embodiment of the present invention allows the head of the occupant to be closer to the headrest, so that the injury due to an impact on the neck region of the occupant and a neck bending upon a collision may be mitigated.

Figure 4:
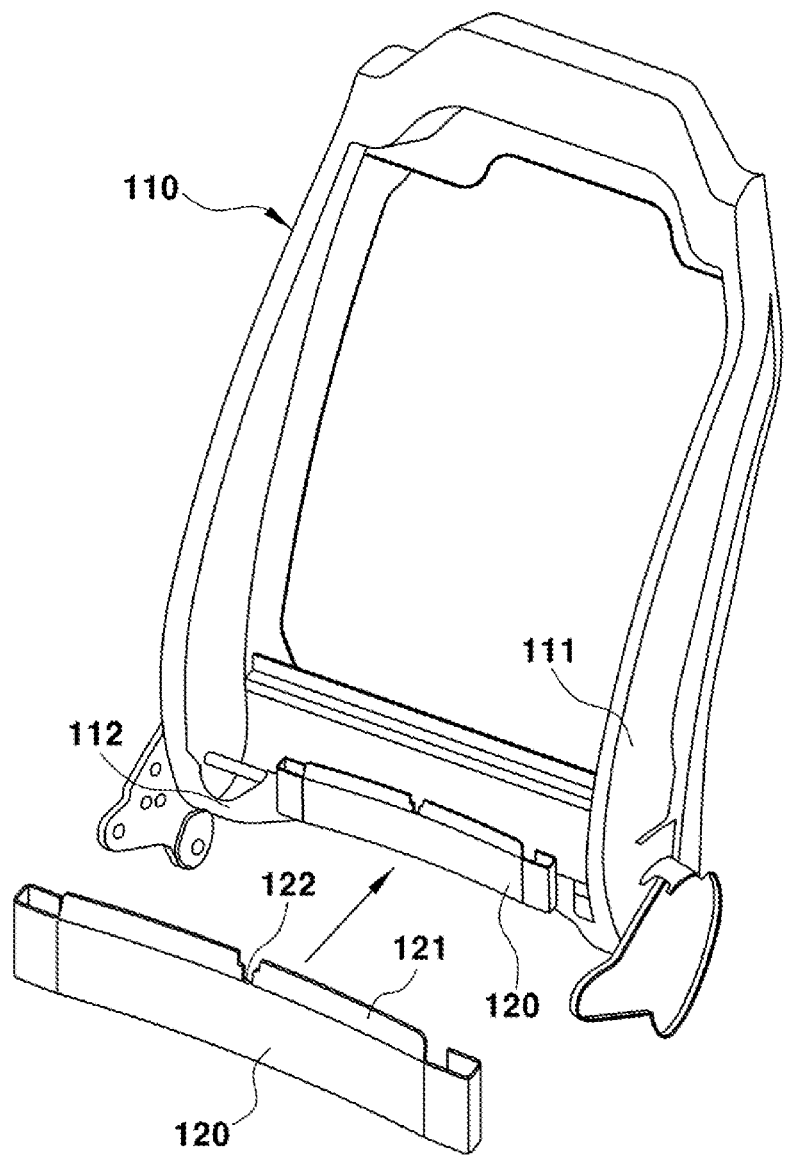
FIG. 4 is a perspective view illustrating a back frame and a protrusion member of a vehicle seat according to an exemplary embodiment of the present invention.
Figure 5:
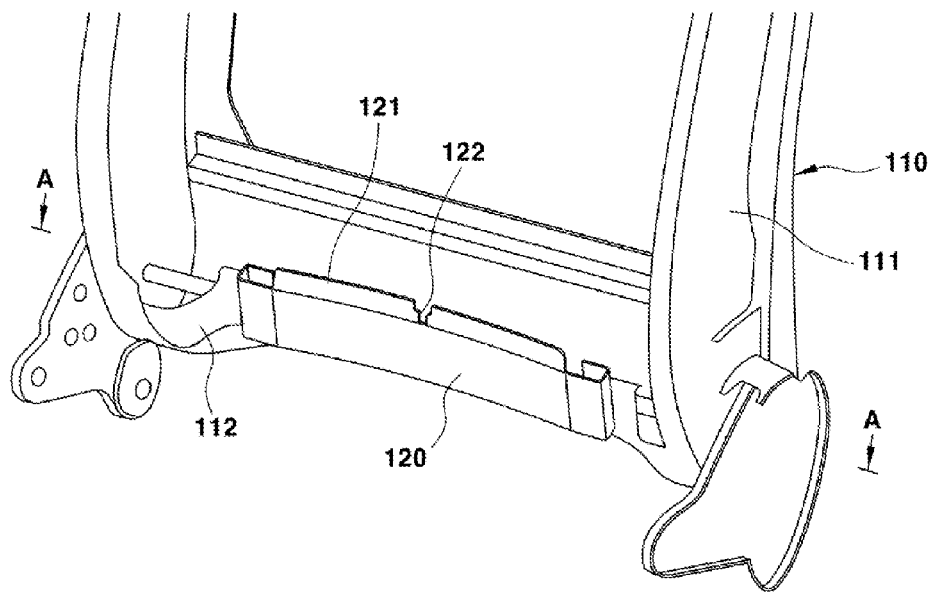
FIG. 5 is an enlarged perspective view illustrating a coupling state of the back frame and the protrusion member of the vehicle seat according to an exemplary embodiment of the present invention.

FIG. 4 is a perspective view illustrating a back frame and a protrusion member of a vehicle seat according to an exemplary embodiment of the present invention. FIG. 5 is an enlarged perspective view illustrating a coupling state of the back frame and the protrusion member of the vehicle seat according to an exemplary embodiment of the present invention.

Figure 6:
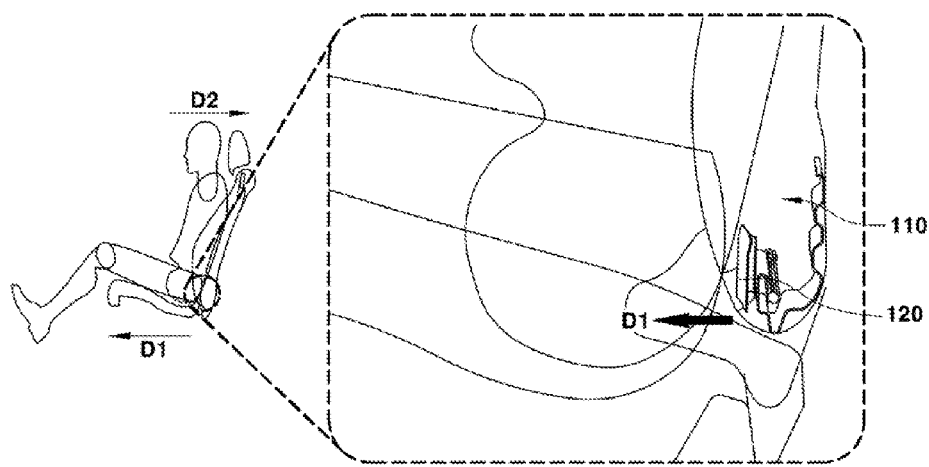
FIG. 6 is a view illustrating an operation effect due to the protrusion member of the vehicle seat according to an exemplary embodiment of the present invention.

In addition, FIG. 6 is a view illustrating an operation effect due to the protrusion member of the vehicle seat according to an exemplary embodiment of the present invention.

As shown in the drawings, the vehicle seat includes a back frame 110 constituting a framework of the seatback and a cross member 112 installed to the lower portion of the back frame 110 to connect left and right side members 111 of the back frame to each other.

The cross member 112 is mounted on the protrusion member 120. According to the vehicle seat of the exemplary embodiment of the present invention, the protrusion member 120, which is formed of a modifiable material, is fixed to the cross member 112 installed to the lower portion of the back frame 110.

The protrusion member formed of a modifiable material serves as a fixing member on the back frame, which absorbs an impact. When the protrusion member 120 is fixed to the lower portion of the back frame 110, that is, a front surface of the cross member 112 of the back frame 110, the lower portion of the seatback has a shape protruding forward corresponding to a volume occupied by the protrusion member.

Thus, when an occupant sits down on the seat and allows his hips (coccyx) to adhere to the lower portion of the seatback, as shown in FIG. 6, the hips of the occupant are pushed forward (that is, direction D1 of FIG. 6) as much as the lower portion of the seatback protrudes. In the state that the hips are placed more forward as compared with that of the related art, the sitting posture of the occupant is modified, such that the occupant sits down in a more lying posture.

After all, the sitting posture is induced to be modified as describe above, so that the head of the occupant is placed to be closer to the headrest (that is, the head moves in direction D2 of FIG. 6 when sitting down), thereby reducing the backset value. Thus, the neck injury due to an impact on the neck of the occupant and a neck bending upon a collision may be mitigated.

Figure 7:
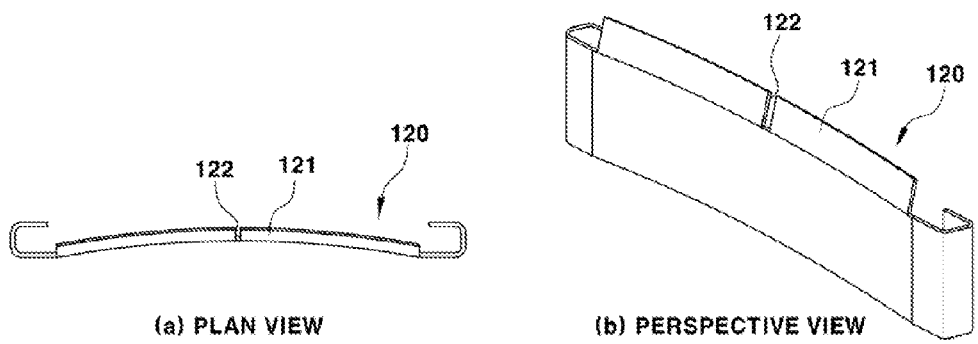
FIG. 7 is a plan and perspective view illustrating the protrusion member of the vehicle seat according to an exemplary embodiment of the present invention.

The protrusion member 120 described above may be fixed to the front surface of the cross member 112 of the back frame 110 through a welding scheme. FIG. 7 is a plan and perspective view illustrating the protrusion member of the vehicle seat according to an exemplary embodiment of the present invention.

The protrusion member made of a modifiable material induces the initial sitting posture of an occupant to be modified. In addition, when the occupant receives an impact upon a collision so that the occupant is pushed into the seatback (rearward based on a longitudinal direction of a vehicle), the protrusion member 120 absorbs the impact while being modified, so that a neck injury may be mitigated.

As shown in FIG. 7, the protrusion member 120 is formed by bending both ends of a plate-shaped member rearward to have a c-shape, and back surface portions of both ends bent in the c-shape are fixed to the front surface of the cross member 112 through a welding scheme.

In this case, the protrusion member 120 is longitudinally disposed on the front surface of the cross member 112 in a longitudinal direction of the cross member 112, that is, in a traversal direction of the back frame 110. When viewed from a top side, as shown in (a) of FIG. 7, the protrusion member has a round shape in consideration of the shape of a human body in order to prevent deterioration of the occupant's comfort, so that both ends thereof protrude more than a central portion thereof.

Due to the round shape, an occupant does not feel a foreign object when sitting down on the seat.

Preferably, a support surface 121 for comfort is additionally formed on the top end of the protrusion member 120 in order to prevent an occupant from feeling a foreign object due to a top edge of the protrusion member embedded in the seatback when the occupant sits down on the seat and allows his hips to adhere closely to the lower portion of the seatback.

That is, as shown in (b) of FIG. 7, the support surface 121 extends from the top end of the central portion of the protrusion member 120 to protrude upwardly and is inclined rearward.

Figure 8:
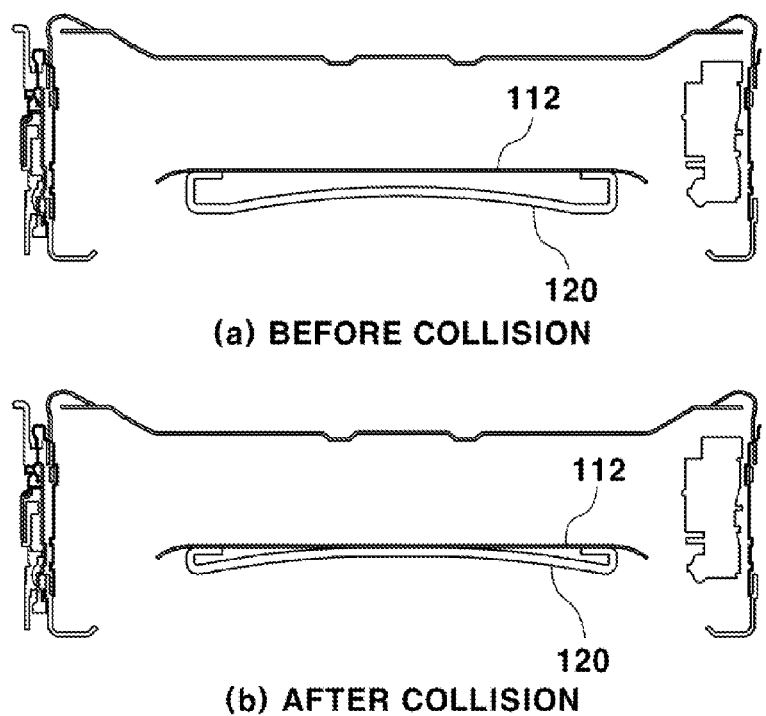
FIG. 8 is a sectional view taken along line A-A of FIG. 5.

In addition, in the state that the back surface portions of both ends bent in the c-shape are attached to the front surface of the cross member 112, the central portion of the protrusion member 120 is spaced apart from the cross member 112 by an interval, so that a space for modification when absorbing the impact is formed therebetween. FIG. 8 is a sectional view taken along line A'-A' of FIG. 5. Hereinafter, a state of the protrusion member 120 modified upon a collision will be described with reference to FIG. 8.

When the occupant receives an impact upon a collision so that the occupant is pushed into the seatback (rearward based on a longitudinal direction of a vehicle), as shown in (b) of FIG. 8, the protrusion member 120 may be pressed and modified while the hips of the occupant is pushed rearward, so that the impact may be absorbed due to the pressure and modification of the protrusion member 120.

When the protrusion member 120 for absorbing an impact is not modified, the hips and back of the occupant is not pushed rearward and supported and sustained by the protrusion member 120, so that the degrees of neck bending and injury may be increased. Therefore, there is a need to enable the protrusion member 120 to be modified upon a collision.

Thus, there is a need to manufacture the protrusion member 120 in the seatback at a thickness and strength which can modify the protrusion member 120 by the pushing force of an occupant upon a collision. When the protrusion member 120 is made of a metallic material such as steel, the support surface 121 preferably includes an incision part 122 formed at a central portion thereof to induce the modification for absorbing an impact, such that left and right parts of the support surface are separated from each other by an interval.

After all, when the vehicle seat according to the exemplary embodiment is applied, since the hips of an occupant adhere to the lower portion of the seatback, but not fully, when the occupant sits down on the seat, the occupant does not feel a foreign object by the protrusion member (that is, the protrusion member does not exert an effect on the sitting sensitivity and comfort in real use). However, since the sitting posture of an occupant is induced to become in a more lying posture, the performance of reducing a neck injury may be improved by reducing the backset.

Of course, when a neck injury test using a dummy is conducted, even though the hips of the dummy are seated at the maximum to the lower portion of the seatback protruding by the protrusion member according to test setting conditions, the dummy is tested in a more lying posture compared with the related art, so that the head of the dummy is most approximate to the headrest. Thus, the backset has a smaller value than that of the related art, so that the performance of reducing a neck injury sufficiently meets the regulations due to the backset reduction.

Figure 9:
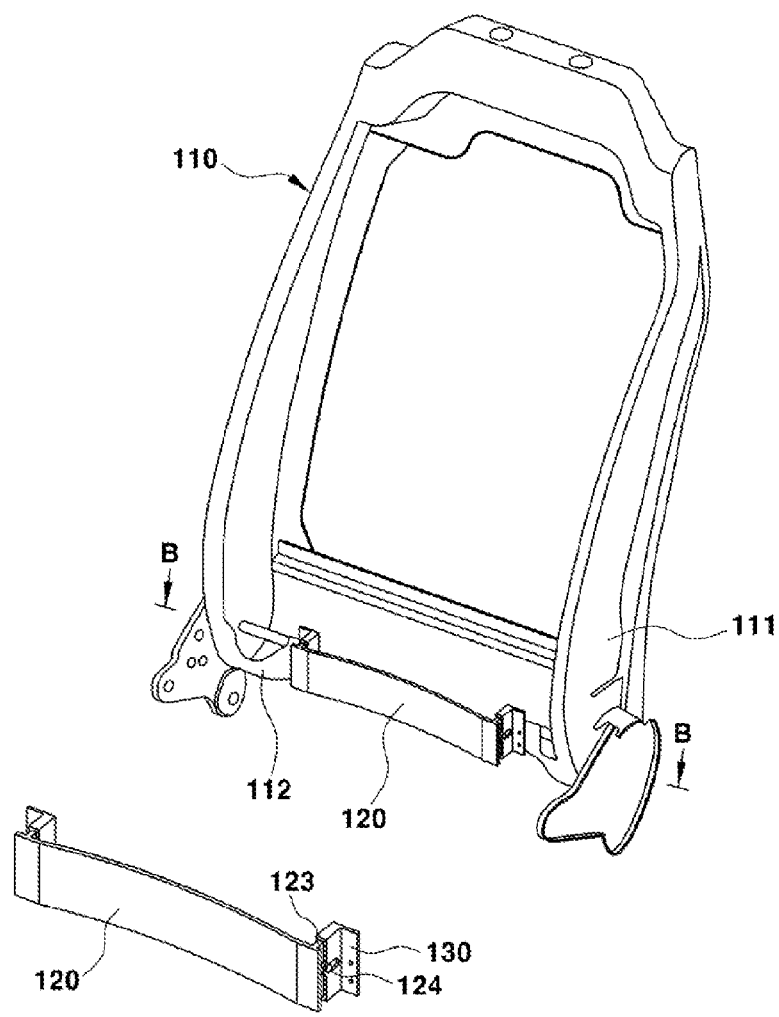
FIG. 9 is a perspective view illustrating the back frame and the protrusion member of a vehicle seat according to another embodiment of the present invention.
Figure 10:
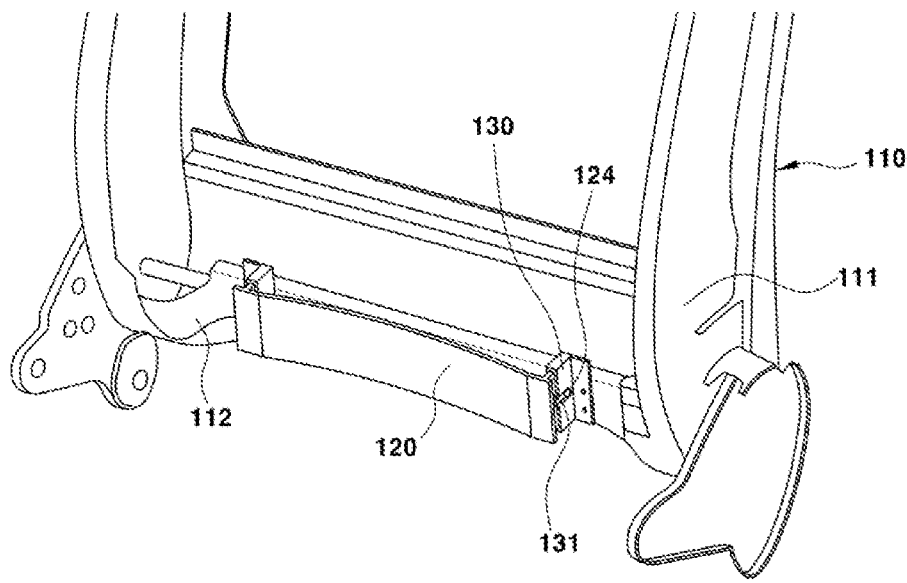
FIG. 10 is an enlarged perspective view illustrating a coupling state of the back frame and the protrusion member of the vehicle seat according to another embodiment of the present invention.

Meanwhile, FIG. 9 is a perspective view illustrating the back frame and the protrusion member of a vehicle seat according to another embodiment of the present invention. FIG. 10 is an enlarged perspective view illustrating a coupling state of the back frame and the protrusion member of the vehicle seat according to another embodiment of the present invention.

As compared with the exemplary embodiment of FIG. 4 in which a fixing-type protrusion member is installed described above, an exemplary embodiment depicted in FIG. 9 includes a sliding-type protrusion member 120 which is mounted on the back frame 110 and elastically supported by a spring 132 to be movable forward and rearward.

The sliding-type protrusion member 120 is installed to move rearward while compressing the spring 132 interposed between the sliding-type protrusion member 120 and the back frame 110 or to move forward by the elastic restoring force of the spring 132.

As compared with the fixing-type protrusion member, the sliding-type protrusion member may increase the initial protruding degrees of the central portion and both ends thereof, so that the degree of the modifying induction of the sitting posture may be increased.

According to a preferable embodiment, the sliding-type protrusion member 120 is installed on the back frame 110 while being elastically supported by a bracket 130 mounted on the back frame 110 and the spring 132 interposed between the bracket 130 and the sliding-type protrusion member 120.

Figure 11:
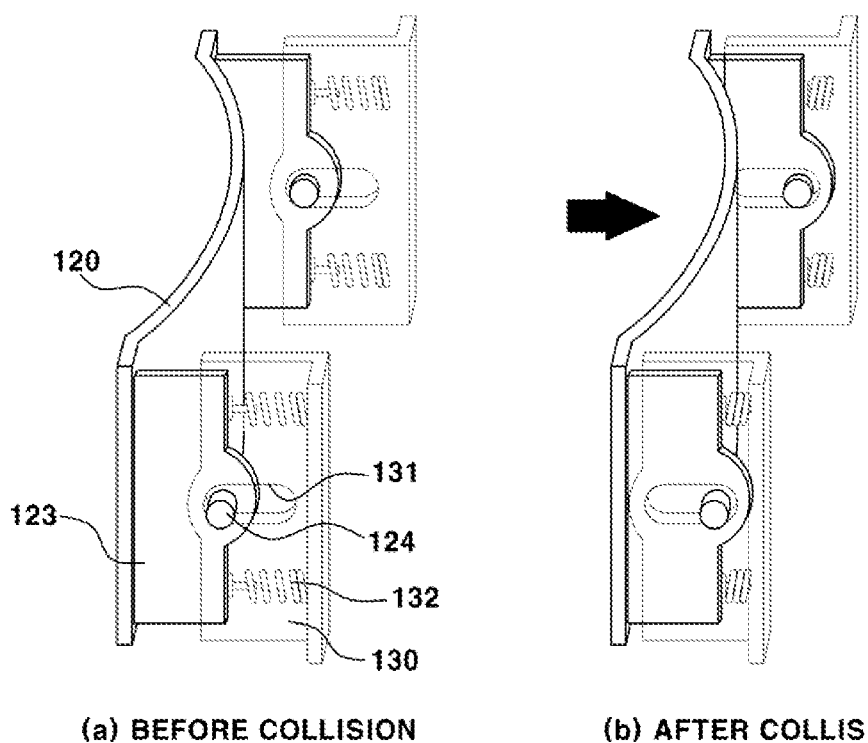
FIG. 11 is a perspective view illustrating a coupling state of a sliding-type protrusion member, a bracket and a spring according to another embodiment of the present invention.
Figure 12:
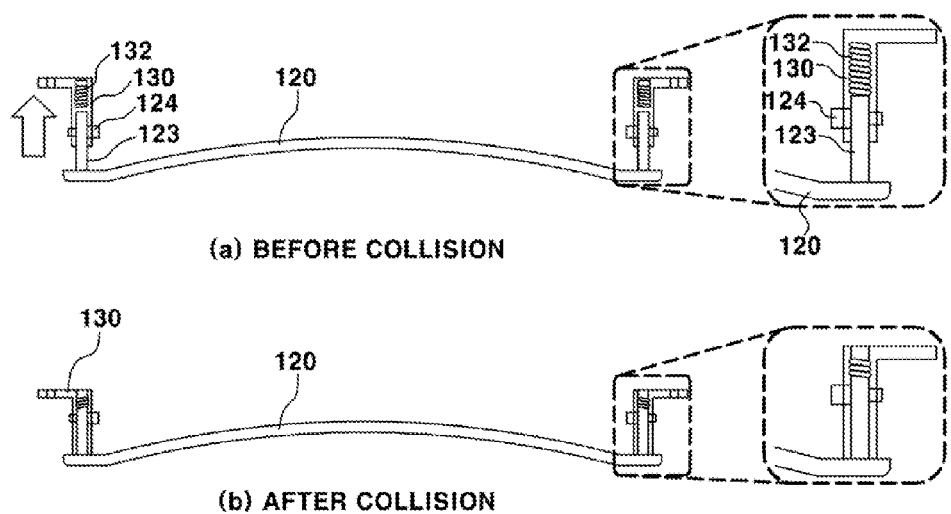
FIG. 12 is a sectional view taken along line B-B of FIG. 9.

FIG. 11 is a perspective view illustrating a coupling state of a sliding-type protrusion member, a bracket and a spring according to another embodiment of the present invention. FIG. 12 is a sectional view taken along line B-B of FIG. 9. The states before and after a collision are shown in (a) and (b) of FIGS. 11 and 12, respectively.

When viewed from a top side, as shown in FIG. 11, the sliding-type protrusion member 120 has a round shape in consideration of the shape of a human body in order to prevent deterioration of the occupant's comfort, so that both ends thereof protrude more than a central portion thereof.

In addition, coupling parts 123 which extend to protrude rearward is provided to both ends of the protrusion member 120. Brackets 130, which are coupled to the coupling parts at positions corresponding to each coupling part of the protrusion member, are installed to the cross member 112 of the back frame 110.

The brackets 130 have a shape to receive each coupling part 123. Each of the coupling parts 123 in inserted inside the corresponding bracket 130 fixed to the cross member 112.

In addition, the spring 132 elastically supporting the coupling part 123 of the protrusion member 120 is provided in the bracket 130. The spring 132 interposed between the coupling part 123 and the bracket 130 elastically supports the protrusion member 120 on the back frame 110.

According to a preferable embodiment, coupling pins 124 protrude from one side surface or both side surfaces of the coupling part 123 in a side direction. Slots 131 are formed on one side surface or both side surfaces of the bracket 130 to allow the coupling pins 124 to be coupled to the one side surface or both side surfaces of the bracket 130 therethrough, such that the slots 131 guide the coupling pins 124 forward and rearward when the protrusion member 120 moves forward and rearward.

The coupling pin 124 is an element that allows the protrusion member and the bracket to be coupled to each other such that the protrusion member 120 is prevented from being separated from the bracket 130. When the protrusion member 120 moves forward or rearward and the coupling pins 124 are guided through the slots 131 of the bracket 130, the protrusion member may be stably operated while the coupling between the protrusion member and the bracket is maintained.

Thus, in the state that both ends of the protrusion member 120 is supported by the back frame 110, that is, the bracket 130 fixed to the cross member 112 of the back frame 110, the protrusion member may move forward and rearward whiling sliding. When an occupant or a dummy sits down on the seat, while the protrusion member 120 is pushed by the hips (coccyx) of the occupant or dummy, the protrusion member 120 presses a portion of the spring 132 and at the same time, is pushed rearward, so that the protrusion may be inserted into the seatback.

Therefore, even though a protruding degree of the lower portion of the seatback for inducing the initial sitting posture of an occupant to be modified, that is, a forward protruding degree of the protrusion member 120 with respect to the back frame 110 is increased, since the protrusion member is naturally pushed by the occupant upon sitting down thereby to move rearward, the protrusion degree is reduced. At this time, since the occupant does not feel a foreign object, the performance in terms of comfort may be satisfied.

Of course, when the force pushing the protrusion member 120 by the occupant or dummy is removed (a weight of the occupant or dummy is removed), the protrusion member 120 returns to the initial position by the restoring force of the compressed spring 132.

In addition, as shown in (b) of FIGS. 11 and 12, according to the collision condition, that is, a rear-end collision condition, the protrusion member 120 moves a little further rearward while more compressing the spring 13 by pushing force of an occupant or a dummy, so that an impact is absorbed by the protrusion member like the exemplary embodiment of FIG. 4.

As described above, according to the vehicle seat of the present invention, the protrusion member having a simple structure is additionally installed to the back frame in order to induce a sitting posture of an occupant to be modified, such that the occupant sits down on the vehicle seat in a more lying posture in the state that the hips (coccyx) of the occupant may be placed forward, thereby allowing the head of the occupant to be closer to the headrest. Thus, the injury by an impact on the neck region of the occupant and a neck bending upon a collision may be effectively mitigated.

When the protrusion member described above is installed, the performance of reducing a neck injury may be satisfied even though any active headrests are not applied, and in addition, the expense and cost may be reduced as compared with the case the active headrest is applied.

In addition, as compared with the case that the headrest is designed to be located ahead (the comfort of an occupant deteriorates due to the interference between the head of the occupant and the headrest), installing the protrusion allows the headrest not to be located ahead, so that the occupant's comfort and the safety performance may be satisfied together.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle seat comprising:
   a protrusion member installed to a lower portion of a back frame inside a seatback to protrude forward and to absorb an impact on hips of an occupant upon a vehicle collision,
   wherein a support member extending upwardly from a top of the protrusion member and inclined rearward of the seatback, and
   wherein a lower portion of the seatback, having a protrusion shape due to the protrusion member, induces a sitting posture of the occupant to be modified such that the hips of the occupant is guided forward by the protrusion member from the seatback and a head of the occupant is guided rearward of the seatback by the protrusion member when the occupant sits down on the vehicle seat, thereby reducing a gap between the head of the occupant and a headrest in a state that the hips of the occupant moves forward.

2. The vehicle seat of claim 1, wherein the protrusion member is formed of a modifiable material to absorb the impact and is fixed to the lower portion of the back frame to be longitudinally disposed in a traversal direction.

3. The vehicle seat of claim 2, wherein the protrusion member has a round shape such that both ends thereof protrude more than a central portion thereof.

4. The vehicle seat of claim 1, wherein the protrusion member is mounted on a front surface of a cross member installed to connect left and right side members to each other at the lower portion of the back frame.

5. The vehicle seat of claim 4, wherein the protrusion member is formed by bending both ends of a plate-shaped member rearward to have a c-shape, and back surface portions of both ends bent in the c-shape adhere to the front surface of the cross member.

6. The vehicle seat of claim 4, wherein the protrusion member is spaced apart from the cross member by an interval such that the protrusion member has a space for modification when absorbing the impact.

7. The vehicle seat of claim 1, wherein the support member includes an incision part formed at a central portion thereof such that left and right parts of the support member are separated from each other by an interval.

8. The vehicle seat of claim 1, wherein the protrusion member is elastically supported on the lower portion of the back frame by a spring such that the protrusion member elastically moves forward and rearward.

9. The vehicle seat of claim 8, wherein the protrusion member is installed to the lower portion of the back frame to be longitudinally disposed in a traversal direction and has a round shape such that both ends thereof protrude more than a central portion thereof.

10. The vehicle seat of claim 8, wherein the protrusion member is coupled to a bracket installed to the lower portion of the back frame while the spring is interposed therebetween.

11. The vehicle seat of claim 10, wherein the protrusion member is installed to the lower portion of the back frame to be longitudinally disposed in a traversal direction and both ends of the protrusion member is coupled to the bracket while the spring is interposed therebetween.

12. The vehicle seat of claim 10, further comprising a coupling part extending to protrude rearward from the protrusion member, wherein the spring is interposed between the coupling part and the bracket while the coupling part is inserted into an inside of the bracket.

13. The vehicle seat of claim 12, further comprising a coupling pin protruding from a side surface of the coupling part, and a slot formed on a side surface of the bracket, wherein the coupling pin is coupled to the side surface of the bracket while passing through the slot formed on the side surface of the bracket and the slot is formed on the side surface of the bracket in a forward and rearward direction to guide the coupling pin along the forward and rearward direction when the protrusion member moves forward and rearward.

14. The vehicle seat of claim 10, further comprising a cross member installed to allow the bracket to connect left and right side members to each other at the lower portion of the back frame, wherein the protrusion member is disposed on a front surface of the cross member.

* * * * *